United States Patent [19]
Maeda et al.

[11] Patent Number: 5,856,925
[45] Date of Patent: Jan. 5, 1999

[54] METHOD FOR MAKING ELECTRONIC CIRCUIT DESIGN DATA AND CAD SYSTEM USING THE METHOD

[75] Inventors: Sumiko Maeda; Hisataka Fukase, both of Yokohama, Japan

[73] Assignee: Fujitsu Limited, Kawasaki, Japan

[21] Appl. No.: 882,754

[22] Filed: Jun. 5, 1997

Related U.S. Application Data

[63] Continuation of Ser. No. 286,234, Aug. 5, 1994, abandoned.

[30] Foreign Application Priority Data

Sep. 27, 1993 [JP] Japan .................... 5-238651

[51] Int. Cl.⁶ .................................................. G06F 15/00
[52] U.S. Cl. .................... 364/489; 364/488; 364/468.03; 364/468.09; 364/474.24; 395/21; 706/919; 706/922; 326/41
[58] Field of Search ................................. 364/488, 489, 364/490, 491, 578, 468, 468.03, 468.09, 468.1, 474.24; 326/41, 39; 395/23, 24, 25, 26, 27, 21, 10, 11, 22, 500, 50, 200.02, 200.1, 900, 919, 921; 361/716, 744, 791; 371/22.1, 22.3, 22.5; 257/774, 784

[56] References Cited

U.S. PATENT DOCUMENTS

| | | | |
|---|---|---|---|
| 4,612,618 | 9/1986 | Pryor et al. | 364/490 |
| 5,175,693 | 12/1992 | Kurosawa et al. | 364/431 |
| 5,341,309 | 8/1994 | Kawata | 364/489 |
| 5,355,317 | 10/1994 | Talbott et al. | 364/468 |
| 5,357,440 | 10/1994 | Talbott et al. | 364/467 |
| 5,359,523 | 10/1994 | Talbott et al. | 364/468 |
| 5,363,313 | 11/1994 | Lee | 364/489 |
| 5,375,069 | 12/1994 | Satoh et al. | 364/489 |
| 5,392,220 | 2/1995 | Van den Hamer et al. | 364/488 |
| 5,410,491 | 4/1995 | Minami | 364/491 |
| 5,455,525 | 10/1995 | Ho et al. | 326/41 |
| 5,493,509 | 2/1996 | Matsumoto et al. | 364/490 |
| 5,499,192 | 3/1996 | Knapp et al. | 364/489 |

Primary Examiner—Jacques R. Louis-Jacques
Attorney, Agent, or Firm—Staas & Halsey

[57] ABSTRACT

In a method for managing design data regarding an electronic circuit in order to design and analyze the electronic circuit, the design data is arranged according to a hierarchical-layer module structure. The design data in each of hierarchical layers of the hierarchical-layer module structure is divided into objects. The objects together for each of the hierarchical layers are connected together and the objects are connected together over the hierarchical layers. The design data including design data having different items and design data having different data lengths is integrally managed.

14 Claims, 9 Drawing Sheets

METHOD FOR MAKING ELECTRONIC CIRCUIT DESIGN DATA AND CAD SYSTEM USING THE METHOD

This application is a continuation of application Ser. No. 08/286,234, filed Aug. 5, 1994, now abandoned.

BACKGROUND OF THE INVENTION

1. Field of the Invention

The present invention relates to a method for managing electronic circuit design data.

Recently, there has been the following increased demands in the development of electronic circuit devices.

(1) There is a trend in an increase in the circuit scale of devices, down-sizing of devices and an improvement in the performance of devices. For example, full-custom LSI devices and MCM (multi-Chip Module) devices have been developed as devices on the above trend. Normally, a hierarchical-layer module design has been employed to achieve such devices, which have a very complex hierarchical-layer structure. In order to realize the high-quality design based on interchangeability in the overall device, it is necessary to analyze and evaluate the design from viewpoints in which the designed hierarchical structure is seen through. Hence, it is required to provide a design data management function capable of integrally managing design data having different lengths in each of the designed hierarchical layers even when the design data should be originally managed in each of the hierarchical layers or originally includes items to be managed in each of the hierarchical layers.

(2) The development of electronic circuit devices is very competitive in order to market higher performance devices in advance of competitors. Hence, nowadays concurrent engineering has been employed in which various design works necessary for the development of devices are concurrently promoted. Examples of these design works are mounting design, a delay time analysis, thermal analysis, test design and so on. In order to perform the concurrent engineering, it is required to efficiently manage a plurality of design versions of a single design object in a period of time. That is, it is required to provide the function of managing the histories in processing of a variety of design data and of easily and efficiently recovering old data.

(3) It is required to follow various needs in the market by efficiently managing different versions of mounting design data with respect to identical circuit design data. That is, it is required to additionally manage different versions of design data having different contents with respect to one basic design data.

(4) The description of the content of the design is not given at the logic gate level but at the high-class description language level corresponding to the operation level under the circumstance in which there are demands of improvements in the quality of electronic devices (in views of parameters such as functions, performance, reliability), an increase in the circuit scale and a reduction in the time necessary for the development. The logic gate level design description can be efficiently generated by using an automatic logic synthesis function. Hence, the following function of managing the electronic circuit design data is needed. That is, the function is needed which simultaneously manages a description of the operations of designed parts in the module design is given by the logic gate level design description and the high-class description language. Further, the function is needed which is capable of providing all possible combinations of arbitrary description levels depending on the objects when handling the overall device.

(5) The development of the following distributed design process is required. That is, the whole design data of the target device is managed by a host computer, while engineering workstations which have recently become popular are used. In this case, the high performance and the graphic function of the workstations are positively unitized to provide the appropriate design environment. Hence, it is required to efficiently manage how the design work is distributed to the workstations. For example, which parts of the design module are handled by the workstations.

(6) There is an increased complexity in the design and analysis works with respect to the layout design of full-custom LSIs or a validation of a logic design including macrocells in which only the timing or function level is known. Under the above situation, a group of CAD (Computer-Aided Design) tools cannot handle all of the design work because the group of CAD tools are developed under the condition that all works are based on consistent interfaces. Hence, it is required to provide CAD tools developed under the assumption of use of different interfaces. It is necessary to apply design data to the CAD tools capable of handling the different interfaces and to feed back the design results to the input sides of the CAD tools.

(7) In order to efficiently accomplish the high-quality design matching the complexity and advance in the design conditions under the LSI technologies, it is required that the designer inputs a design target or intent regarding a particularly design part or use different design restriction conditions with respect to a partially identical design element. Hence, even in the management of design data, it is required to manage the design target, the design intent and the design restriction and apply information concerning the above matters to the CAD tools for use in supporting of design/analysis, so that the design and analysis can be finely supported.

2. Description of the Prior Art

Figure 1:
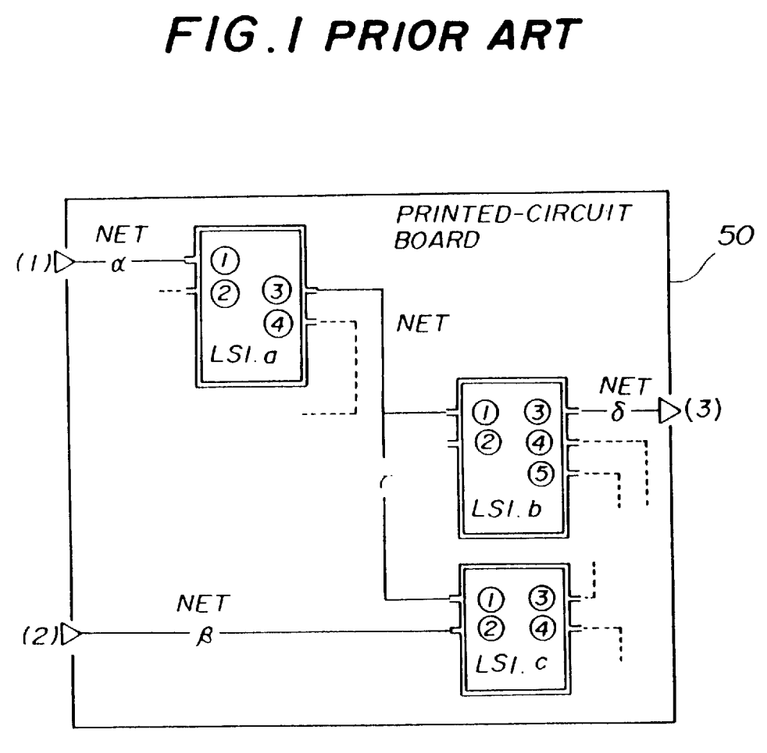
FIG. 1 is a diagram of a printed-circuit board.

FIG. 1 is a diagram of a printed circuit board in which LSI chips are used as sub-modules. A printed-circuit board 50 has external terminals (1), (2) and (3), and three LSI chips LSI.a, LSI.b and LSI.c mounted on the printed-circuit board 50. Numerals in circles denote input or output terminals of the LSI chips, and symbols $\alpha$, $\beta$, $\tau$ and $\delta$ denote interconnections (nets) connecting the input/output terminals of the three LSI chips and the external terminals (1), (2) and (3) of the printed-circuit board 50.

Figure 2:
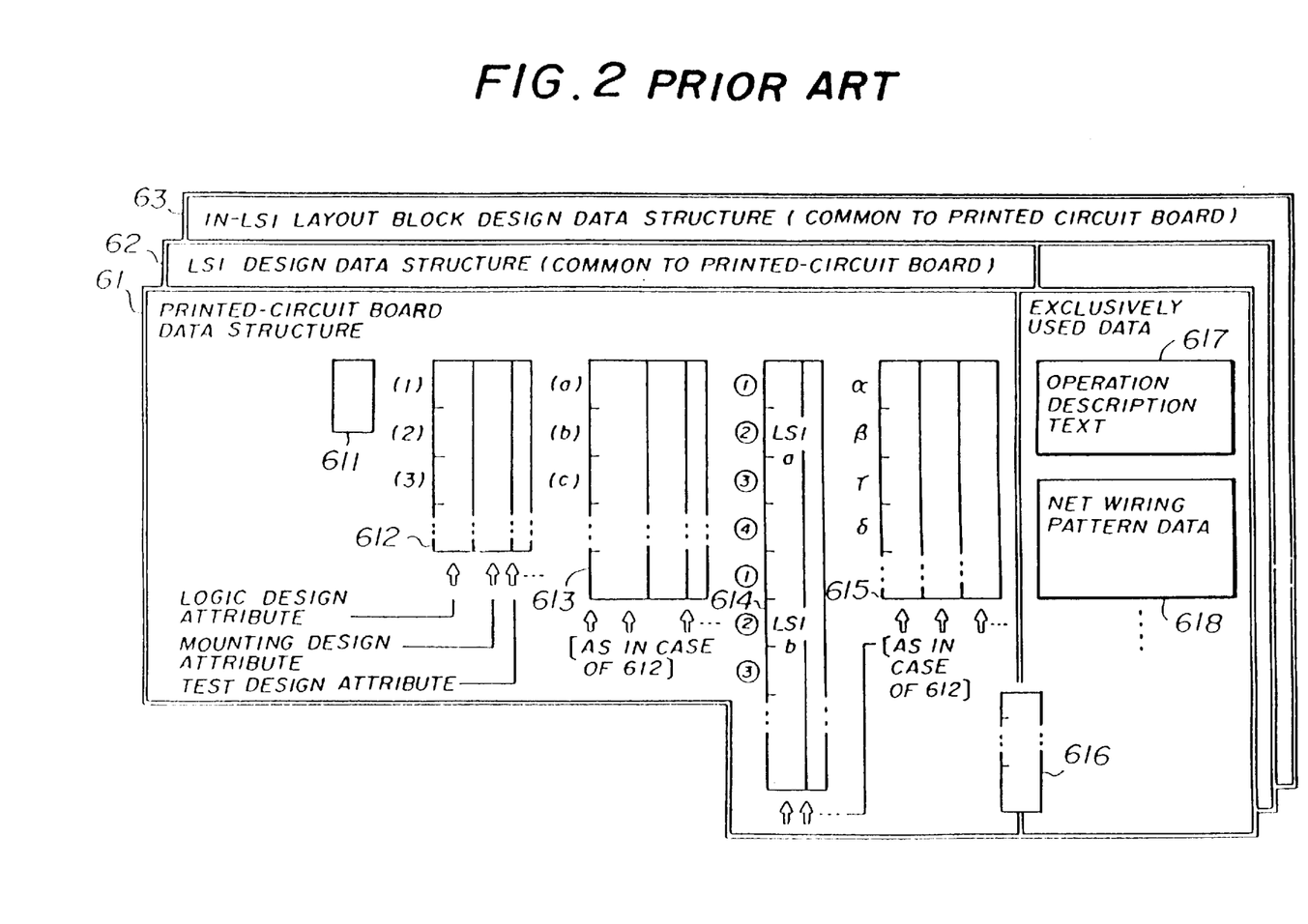
FIG. 2 is a block diagram of a conventional method for managing electronic circuit data.

FIG. 2 is a conventional method for managing electronic circuit design data regarding the printed-circuit board shown in FIG. 1. The method shown in FIG. 2 includes a first hierarchical layer 61, a second hierarchical layer 62, and a third hierarchical layer 63. The first hierarchical layer 61 describes the structure of the printed-circuit board design data. The second hierarchical layer 62 describes the structure of LSI design data. The third hierarchical layer 63 describes the structure of in-LSI layout/block design data. The numerals and symbols (1), (2), (3), a, b, c, $\alpha$, $\beta$, $\tau$, and $\delta$1 through 5 placed in circles correspond to those shown in FIG. 1.

The first layer 61 describing the structure of the printed-circuit board design data manages printed-circuit board title data 611, printed-circuit board external terminal data 612, mounted-LSI data tables 613, a mounted-LSI input/output terminal data table 614, an on-printed-circuit board interconnection data table 615, and a database access unit 616. The printed-circuit board title data 611 stores data which represents the overall printed-circuit board. The printed-circuit board external terminal data 612 stores data regarding the external terminals attached to the printed-circuit board. The mounted-LSI data table 613 stores the design data of the LSIs mounted on the printed-circuit board. The mounted-LSI input/output terminal data table 614 stores data regarding all the input/output terminals attached to the printed-circuit board. The on-board interconnection data table 615 stores data regarding the shapes of the nets formed on the printed-circuit board. The database access unit 616 indicates the size of data of the minimum unit accessible to the database.

Further, a group of an operation describing test 617 and net wiring figure (pattern) data 618 is managed as particular (exclusively used) data. The operation describing test 617 describes the operations in test format. The net wiring pattern data 618 is length-undefined data which is not suitable for management of arrangements.

In FIG. 2, the printed-circuit board external terminal data table 612, the mounted-LSI data table 613 and so on are managed for each hierarchical layer in table format by a database which manages data in table format such as a relational database. For example, in the printed-circuit board external terminal data table 612 is managed so that data can be individually accessed for each design work while keeping the correspondence with the table as in the case of a logic design attribute table, a mounting design attribute table, a text design attribute table and so on. The logic design attribute table indicates which logic levels of signals are applied. The mounting design attribute table indicates connections when mounting parts. The test design attribute table indicates states to be set when testing the circuits.

More particularly, the logic design attribute table, the mounting design attribute table and the test design attribute table manage the following data.

Logic Design Attribute Data Managed by Logic Design Attribute Table external terminal data:
  signal type (clock, reset and so on); the total amount of loads
sub-module data:
  sub-module identification name; sub-module name; positions on circuit diagram
sub-module data input/output terminal data:
  pin name; connection net identification name; driving ability/load value

Mounting Design Attribute Data Managed by Mounting Design Attribute Table external terminal data:
  external pin positions
sub-module data:
  position of arrangement; direction of arrangement
sub-module data input/output terminal data:
  sub-module physical pin positions; information concerning process for not-used terminals
net data:
  pattern incomplete mark; wiring length; noise margin

Test Design Attribute Data Managed by Test Design Attribute Table external terminal data:
  setting value at the time of testing; external input/output net type (through, flip-flop reaching)
sub-module data:
  out-of-test mark; redundant circuit mark; divided identification name;
sub-module data input/output terminal data:
  equivalent fault group name; fault-detected mark
net data:
  test pattern number; redundant net mark Further, the mounted-LSI data table 613, the mounted-LSI input/output terminal data table 614 and the on-board net data table 615 are managed in the same manner as the above-mentioned printed-circuit board external terminal data table 612 so that data can be individually accessed for each design work while keeping the correspondence with the table. The input/output terminal data of the LSIs of the low-hierarchical-layer module in the mounted-LSI input/output terminal data table 614 can be taken (or assumed) by copying necessary items among the already designed LSI design data, so that the above input/output terminal data is managed separately from the low-hierarchical-layer module.

The second hierarchical layer 62 describing the LSI design data structure and the third hierarchical layer 63 separately manage the LSI design data structure and the in-LSI layout block design data structure in table format as in the case described above.

Conventionally, since the design data is managed in the above-mentioned manner, it is easy to add and delete items of design data in table unit and changes in the data length. Hence, the design data matches a group of CAD programs developed so as to handle the above design structure. Further, it is possible to efficiently realize interfaces.

However, the conventional design data management method has the following disadvantages.

(1) The hierarchical design layers are independently managed by copying and holding necessary items among the input/output terminal data of the low-hierarchical-layer module, and there is no viewpoint directed to management of the hierarchical layers as a device whole. Even if such a viewpoint is simply employed, a problem will occur in which there are many different data lengths and the management spaces cannot be efficiently utilized.

(2) It is difficult to efficiently manage only a part subject to design change because data is managed in table format as a whole.

(3) It is difficult to realize a management mechanism that handles complex design data so that a plurality of terms of mounting data are made to correspond to a single term of logic design data and to be saved.

(4) The operation describing text related to the overall printed-circuit board may be managed while keeping the correspondence. However, it is impossible to manage an operation describing text in which there are mixed description levels over the hierarchical design layers.

(5) the hierarchical module structure is not positively managed, another mechanism should be introduced in order to manage the distributed process using the workstations forming a network structure.

(6) When a CAD system is attempted to establish an interface with another CAD system, it is necessary to process the overall design data when transferring data between these CAD systems since the overall design data is managed in table format. Hence, a huge amount of data processing is needed.

(7) Since the management of design data is based on table format, it is very difficult to handle data having various data lengths such as text-like data (for example, design restriction conditions or design target conditions), data used in equations or wiring pattern data.

That is, the above-mentioned prior art has the following disadvantages.

(1) The design data having the hierarchical module structure assumes or input, for each hierarchical layer, design of the low-hierarchical layer necessary for the design supporting process for a layer being considered, and manages it independently. However, as an increased variety of design hierarchy, the designer which thoroughly develops the overall device understands the device as a whole, nevertheless in actuality the designer is needed to understand the device in the disassembled state. Hence, there is an increased design overhead (for example, an identical design attribute extending over the hierarchical design layers) must be indicated in each hierarchical layer. Hence, an increased number of design steps is needed.

In the development of the CAD tools for supporting the design work, design data is needed which extends the hierarchical structure in the processes such as logical simulation of the overall device, an analysis of delay times thereof, and a test thereof.

Further, since the conventional design data management method independently manages design data for each hierarchical layer, the respective CAD tools independently perform the hierarchical structure extending process according to the respective objects of processing.

Hence, as the hierarchical structure becomes complex, an increased number of developing steps is needed. Further, due to the differences in the extending system among the CAD tools, a problem is encountered in which the designer who uses the CAD tools communicate with the CAD tools with different interfaces. For example, the CAD tools give an design object different names, and the designer is needed to understand the correspondence between the CAD tools and the respective names.

The above problems about the conventional design data management arise from the fact that variations in items and lengths of the design data to be managed in each hierarchical structure are not intended to be flexibly handled in order to save the efficiency in computation and the storage capacity for storing the design data.

(2) When a design change is requested (irrespective of whether the design change needs a change in the circuit design, the mounting design or the delay time analysis), all of new design/analysis data is managed in each design version. That is, only a part related to the design change cannot be managed, and new tables including parts requested to be changed are produced and managed.

However, due to applications of the concurrent engineering, the number of design versions to be temporarily saved is increased and the number of files to be saved is increased. Accordingly, the number of steps of manually managing a large number of design versions is increased, and the efficiently in design and development is degraded.

(3) When a plurality of items of mounting design data are made to correspond to a single item of logic design data, all possible combinations of the single item of logic design data and the items of mounting design data as in the case of the aforementioned design change history management. For example, if there are printed-circuit boards of different mounting levels, such as a high-quality product and an ordinary-quality product, new tables are produced with respect to the printed-circuit boards of the different mounting levels and are managed.

However, with an increased variety of needs in the market, the number of possible combinations is increased, and the amount of design to be saved and the number of steps for manual management are increased.

(4) The conventional method manages one-by-one correspondence between the different description levels, such as the description of the structure having logic gates as constituent elements with respect to a logical function unit and the operation description by the text language. However, the conventional method does not manage, as the whole of the device designed by the hierarchical module structure, what description is present in what part.

When the design/analysis support is carried out for the overall device or a wide range thereof, there is no available supporting function making it easy to generate combinations of description levels suitable for the object thereof. For example, it is impossible to manage data in a mixed mode in which the operation description texts of different levels, such as the level described by the high-class language and the logic gate level, are mixed. Hence, complex manual process is needed to realize the supporting function.

(5) Conventionally, a process necessary for an MMI (Man Machine Interface) using a high-performance graphic display, such as design of the layout of an LSI is executed in the distributed process by means of engineering workstations. Also, a huge amount of design data for evaluating the design of the overall device is processed by a host computer. Recently, due to spread of workstations, a distributed process as described above has been widely performed. In addition, the hierarchical-layer module structure which has recently become complex can be processed by a complex distributed process. However, the conventional distributed process needs to manually manage what part should be processed in what distributed method.

(6) Conventionally, a group of CAD tools were constructed so as to handle a common database as an integrated system. However, with an increased variety of design work and increased complexity thereof, a situation has occurred in which use of a CAD tool developed so as to handle a different interface (a CAD tool developed by another company) is needed. However, use of such a CAD tool needs to prepare a conversion process which is realized by a large program and which needs a long time for execution. Further, design data needed by the CAD tool must be bridged. Under the above situation, if design data is transferred between the CAD tools having different formats, it is impossible to efficiently process the design data.

(7) Conventionally, the design restrictions and design evaluation indices are prepared in the respective design supporting tools. The designer evaluates the design results and optimize them by means of the supporting tools. However, it is impossible to partially modify the design restrictions and design evaluation indices and to efficiently perform the design support. Further, it is impossible to dynamically supply data regarding the design restrictions and the design evaluation indices to the supporting tools and to reduce the load of the designer.

SUMMARY OF THE INVENTION

It is a general object of the present invention to provide a method for managing electronic circuit design data and a CAD system using this method, in which the above disadvantages are eliminated.

A more specific object of the present invention is to provide a method for managing electronic circuit design data and a CAD system using this method capable of resolving the above disadvantages as follows.

The first object of the present invention is to eliminate the aforementioned disadvantage (1) and to provide a method for managing electronic circuit design data and a CAD system capable of flexibly managing items and lengths of design data to be managed in each hierarchical-layer structure although the efficiency in the process of a computer may be slightly degraded.

The second object of the present invention is to eliminate the aforementioned disadvantage (2) and to provide a method for managing electronic circuit design data and a CAD system in which a design modification history management based on a unit that includes design data about a modified part and a peripheral part of the modified part is managed without an increase in the overhead of control data for management, while a group of new design data including data related to parts which are not modified is saved, so that a large amount of design data are wastefully saved in two or more storage portions, so that an arbitrary version of design data can easily be recovered.

The third object of the present invention is to eliminate the aforementioned disadvantage (3) and to provide a method for managing electronic circuit design data and a CAD system capable of efficiently and integrally managing a plurality of pieces of mounting design data without a storage in which the identical design data is stored in two or more storage portions and easily taking out arbitrary mounting design data and associated design data.

The fourth object of the present invention is to eliminate the aforementioned disadvantage (4) and to provide a method for managing electronic circuit design data and a CAD system having a high-efficiency design data management function capable of handling a design in which different description levels are mixed.

The fifth object of the present invention is to eliminate the aforementioned disadvantage (5) and to provide a method for managing electronic circuit design data and a CAD system capable of efficiently and certainly managing the distributed process set forth in the aforementioned paragraph (5) rather than the manual management.

The sixth object of the present invention is to eliminate the aforementioned disadvantage (6) and to provide a method for managing electronic circuit design data and a CAD system capable of efficiently establishing interfaces with any other CAD tools.

The seventh object of the present invention is to eliminate the aforementioned disadvantage (7) and to provide a method for managing electronic circuit design data and a CAD system capable of managing the design restrictions and design indices together with design data to finely support the design work with a reduced load.

The above objects of the present invention are achieved by a method for managing design data regarding an electronic circuit in order to design and analyze the electronic circuit, the method comprising the steps of:

(a) arranging the design data according to a hierarchical-layer module structure;

(b) dividing the design data in each of hierarchical layers of the hierarchical-layer module structure into objects; and (c) connecting the objects together for each of the hierarchical layers together and connecting the objects together over the hierarchical layers, the design data including design data having different items and design data having different data lengths being integrally managed.

The above object of the present invention is also achieved by a CAD system having a function of managing design data regarding an electronic circuit in order to design and analyze the electronic circuit, the CAD system comprising:

first means for arranging the design data according to a hierarchical-layer module structure;

second means for dividing the design data in each of hierarchical layers of the hierarchical-layer module structure into objects; and third means for connecting the objects together for each of the hierarchical layers together and connecting the objects together over the hierarchical layers, the design data including design data having different items and design data having different data lengths being integrally managed.

BRIEF DESCRIPTION OF THE DRAWINGS

Other objects, features and advantages of the present invention will become apparent from the following detailed description when read in conjunction with the accompanying drawings, in which.

DESCRIPTION OF THE PREFERRED EMBODIMENTS

Figure 3:
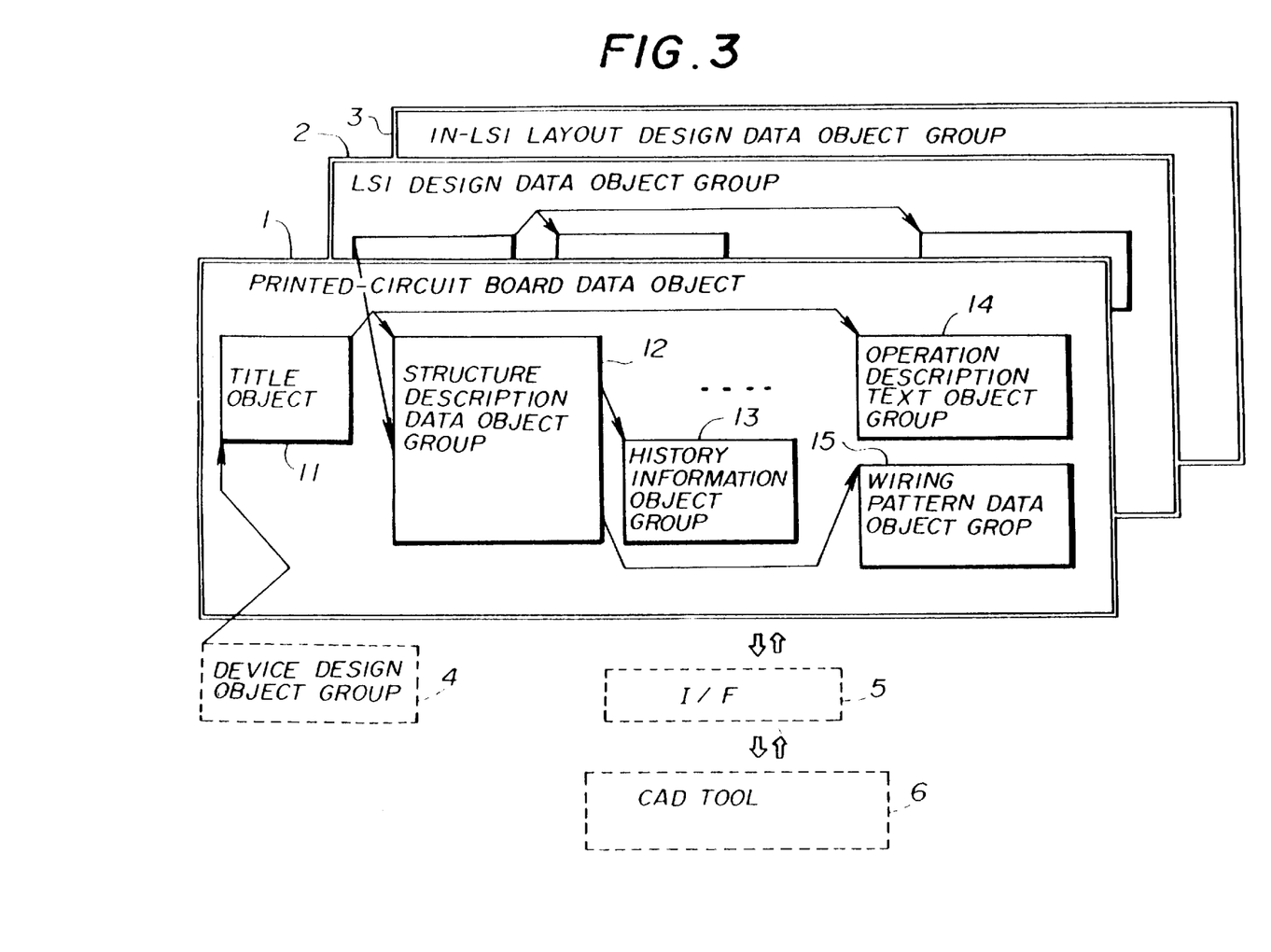
FIG. 3 is a block diagram of the principle of the present invention.

FIG. 3 is a block diagram of the principle of the present invention. The structure shown in FIG. 3 includes electronic circuit design data groups 1, 2 and 3 divided in a hierarchical-layer module structure, an interface 5, a CAD tool 6 supporting the design work, and a group of objects 11 through 15 in the hierarchical-layer modules.

The data in each of the hierarchical layers is divided into the objects 11 through 15, and the objects within each of the hierarchical layers and between the hierarchical layers are related by links, so that electronic circuit design data, including design data having different items and different lengths, can be integrally managed.

More particularly, a group of electronic circuit design data which is the management unit is divided into the hierarchical modules 1, 2, 3 and 4, and are linked. The electronic circuit design data in each of the hierarchical layers is divided into items of data having different description levels, such as the structure description and the operation description. The structure description data is divided into the object groups 11, 12, 13, 14 and 15 such as external terminal data, sub-module data, and net data. Further, each of the items of data is divided into items on the type of the design work, which items are then linked. Further, if necessary, the data is hierarchically divided into items related to the design attribute such as history information 13 indicating the history of design modifications.

According to the present invention, the electronic circuit design data is divided into the hierarchical-layer modules. Hence, the electronic circuit design data can be integrally managed even when it contains data having different attributes and different data lengths.

The design modification history information 13, which may be needed in the progress of the design/analysis work, is associated with the related design data by links. Hence, design data can be managed while adjusting the amount of peripheral data redundantly stored and the amount of an overhead of control data for the modification history management. Hence, it is possible to efficiently perform the design history management.

When new design data is added to basic design data in a process in which designs having different contents are handled, the new design data is associated with the basic design data by links, so that a plurality of combinations with the new design data can be efficiently managed. Hence, it is not necessary to redundantly store the basic design data and take out necessary data when needed.

The data 14 represented in expression formats of a different description level is related to an identical part of the design data having the hierarchical-layer module structure by means of a link, so that data having a plurality of expression formats of different design description levels can be managed. In addition, data in which some design description levels are mixed can be easily extracted on the parts base from the design data of the over electronic circuit.

The structure shown in FIG. 3 can be accomplished by a host computer which integrally manages the overall design data, and process-distributed computers that are connected to the host computer via a network and process specific design parts in the hierarchical-layer module structure. The host computer can manage which parts are processed by which process-distributed computers and whether or not design data resulting from the distributed processes has been returned to the host computer.

The interface 5 establishes an interface among the CAD tool 6, data having table-format and electronic circuit design data having the hierarchical-layer module structure. Hence, it is possible to transfer among the above in efficient design data units dependent to the contents of the design work needed by the parts which communicate with each other.

The design restrictions due to the intents, targets or knowledge of the designer or design elements are registered in parts of the design data in advance. In the process of various design/analysis works having different contents, the above design restrictions are dynamically referred to, so that the high-quality, high-efficiency design supporting can be achieved.

Figure 4:
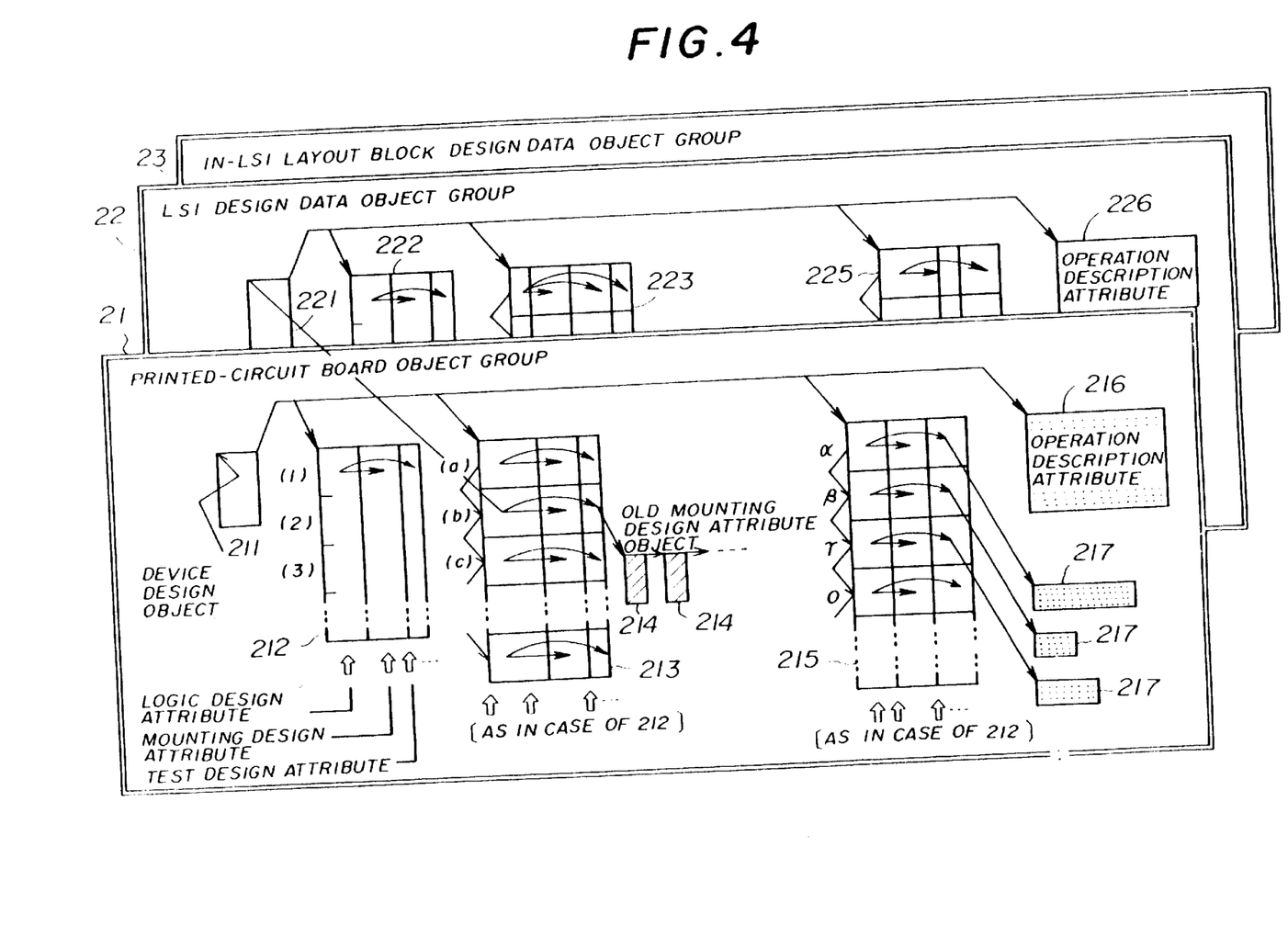
FIG. 4 is a block diagram of a method for managing electronic circuit design data according to an embodiment of the present invention.

FIG. 4 is a diagram showing the method for managing electronic circuit design data according to an embodiment of the present invention. More particularly, FIG. 4 shows how data regarding the printed-circuit board shown in FIG. 1 is managed according to the embodiment of the present invention.

Referring to FIG. 4, there are provided a first hierarchical layer 21 describing a group of objects of the printed-circuit board design data, a second hierarchical layer 22 describing a group of objects of LSI design data, and a third hierarchical layer describing a group of objects of in-LSI layout block design data. The symbols shown in FIG. 4, namely a group of (1), (2), (3), a group of a, b, c, a group of $\alpha$, $\beta$, $\tau$, and a group of $\delta$ 1 through 5 placed in circles correspond to the external terminals of the printed-circuit board, three LSIs LSIa, LSIb and LSIc, the input/output terminals of each LSI, and the number of nets, respectively.

In the first hierarchical layer 21 describing a group of objects of the printed-circuit board design data, a printed-circuit board device design as title object 211 manages almost the same as the printed-circuit board title data shown in FIG. 2, but has a link addressed to upper design hierarchical-layer modules in order to positively manage hierarchical-layer module structure.

Further, the printed-circuit board title object 211 includes links addressed to a printed-circuit board external terminal data object 212, a mounted-LSI data object 213, an operation describing text 216 handled as exclusively used data, so that data-to-data correspondence can be positively managed. That is, these links enable access to the upper design hierarchical-layer modules and the printed-circuit board external terminal data object 212.

In the embodiment of the present invention being considered, the printed-circuit board external terminal data table shown in FIG. 2 is divided into groups based on the contents of design work, such as logic circuit design data and logic circuit diagram data. Then, these divided groups of data are linked from basic data and are flexibly managed.

For example, in FIG. 4, the printed-circuit board external terminal data is grouped into a logic design attribute data object, a mounting design attribute data object and a test design attribute data object. The mounting design attribute data and the test design attribute data are linked from the logic design attribute data. The external terminals are not individually handled but handled as a group (object) in order to prevent an excessive increase in the overhead of the control data caused by individually handling the external terminals.

The mounted-LSI data or the on-board net data is handled so that each LSI and each net formed on the printed-circuit board is individually managed and is related to each other by links. Further, the mounted-LSI data or the on-board net data is divided on the basis of the contents of the design work as in the case of the printed-circuit board external terminal data, and divided data forms an object, which is flexibly managed by means of a link from the basic data.

In the structure shown in FIG. 4, the mounted-LSI data is divided into some data for each of the LSIs (a), (b), (c), . . . , which are sequentially linked. Further, each divided mounted-LSI data is divided into the logic design attribute data, the mounting design attribute data and the test design attribute data as in the case of the printed-circuit board external terminal data, and is managed as the mounted-LSI object group 213. The items of the data in the group 213 are related to each other by means of links. Further, the mounted-LSI data is related, by means of links, to an old mounting design object group 214 describing the design change history information.

Similarly, the on-board net data is divided on the base of each of the nets such as $\alpha$, $\beta$, $\tau$ and $\delta$, which are sequentially linked. As in the case of the printed-circuit board external terminal data, the divided on-board net data is divided into the logic design attribute data, the mounting design attribute data and the test design attribute data, and is managed as a group of objects of the on-board nets, which are linked. Further, the on-board net data is related to a group 217 of wiring pattern data.

The LSI design data object group 22 and the in-LSI layout block design data object group are divided into objects related to each other by links in the same manner as described above.

According to the embodiment of the present invention, a group (object) of design data on the management base is divided for each hierarchical-layer module. Next, the divided data is divided into data described at the different description levels such as the operation description and the structure description. Then, the structure describing data is divided into external terminal data (which is handled as a group of external terminals, not handled individually), sub-module data and net data. Further, each of the sub-module data and the net data is divided into individual parts. Thereafter, the individual data is divided into parts for each of the contents of the design work and is linked. Then, if necessary, the divided parts are hierarchically divided into parts of a more specifically defined design attribute (which includes a modification history attribute or the like).

As describe above, the embodiment of the present invention being considered positively manages the hierarchical module structure. Hence, it is necessary to copy input/output terminal data of the low hierarchical-layer module and separate the relationship between the hierarchical layers from each other. As a result, according to the embodiment of the present invention, it becomes possible to efficiently manage the hierarchical module structure itself.

In a case where a plurality of identical sub-modules are used, only data needed in an upper hierarchical layer is copied as real data and managed.

Since the data is divided and linked on the basis of the contents of the design work, it is possible to efficiently manage a plurality of groups of design data to be added to a group of basic data in such a case that a mounting design is carried out on the basis of the results of the logic design and mounting data thus produced is added.

Further, it is possible to manage, with respect to part of the design data having the hierarchical module structure, a plurality of expressions of different design description levels such as the circuit design description by means of logic gates and the operation description by means of VHDL described in the IEEE standard. Further, when referring to the design data of the overall device, it is easy to extract the description of a part of the device in which arbitrary design description levels are mixed.

Furthermore, it is possible to register in advance the intents, targets or knowledge of the designer, or the design restrictions due to design elements such as an inherent condition obtained from the LSI technology are registered for the parts base.

Figure 5:
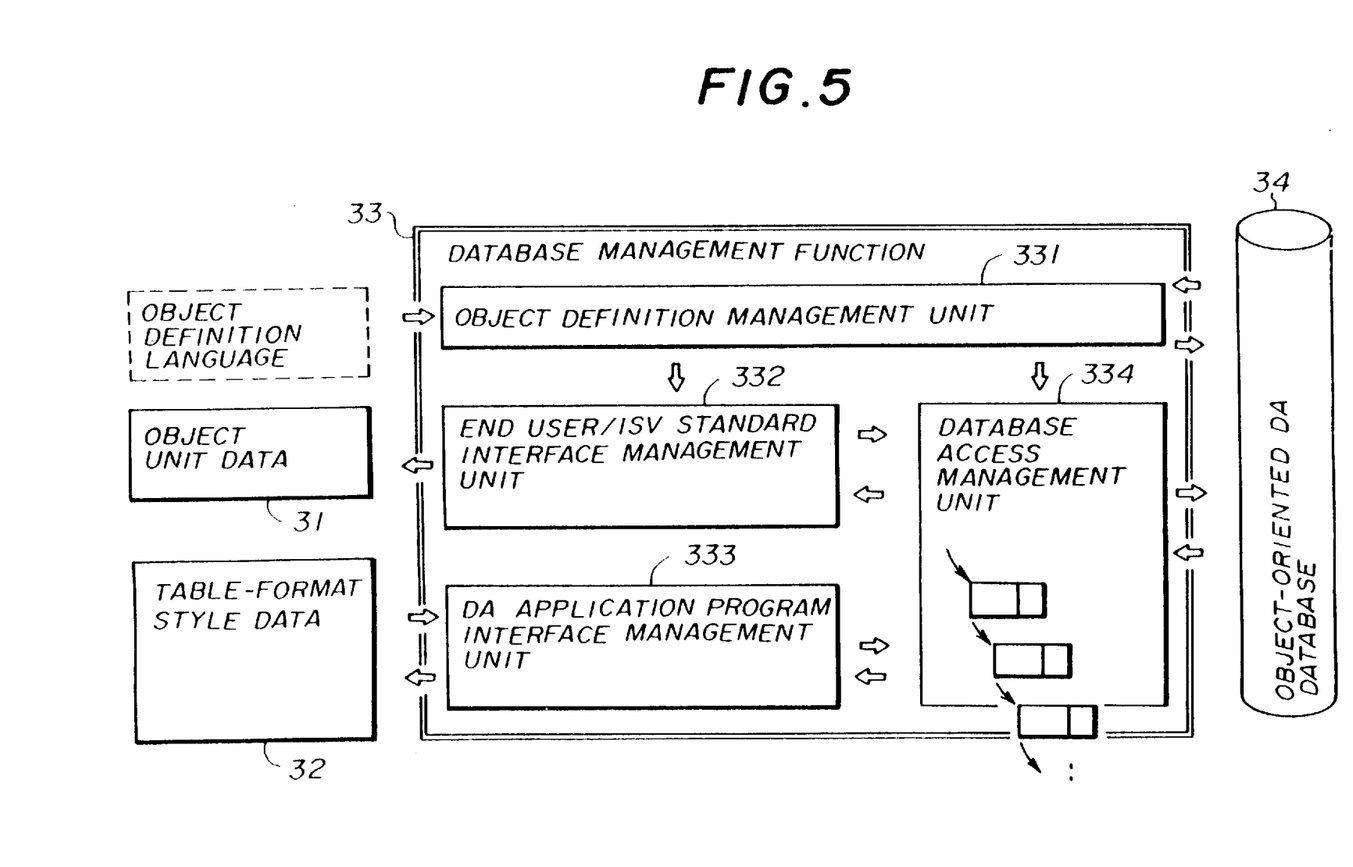
FIG. 5 is a block diagram of a database system (CAD system) according to another embodiment of the present invention.

FIG. 5 is a block diagram of an object-oriented database system (CAD system) according to an embodiment of the present invention. The system shown in FIG. 5 can access an interface constructed by a different design idea or architecture.

In FIG. 5, there are illustrated data 31 of the object unit, such as specific CAD data or the like, data 32 of a table format conventionally used, and a database management function unit 33. The unit 33 includes an object definition management unit 331 providing data definition, an end user/ISV (Independent Software Vender) standard interface management unit 332, a DA (Design Automation) application program interface unit 333, and a database access management unit 334. The end user/ISV standard interface management unit 332 exchanges data having the object format (object-oriented data) handled in the embodiment of the present invention being considered with data of an object unit processed by a CAD system. The DA application program interface unit 333 exchanges data having the table format with the object-oriented data. The database access management unit 334 accesses a database in which object-oriented data is stored. The system further includes an object-oriented type DA database 34.

In FIG. 5, the data of the object unit such as specific CAD data is converted into object-oriented data by the end user/ISV standard interface management unit 332, and is stored in the object-oriented DA database 34 via the database access management unit 334. Similarly, the data 32 in the table format is converted by the DA application program interface management unit 333, and is stored in the object-oriented type DA database 34 via the database access management unit 334.

Similarly, the object-oriented data stored in the object-oriented type database 34 is converted into the object unit data 31 and table format type data 32 by the end user/ISV standard interface management unit 332 and the DA application program interface management unit 333, respectively.

By providing the above database management functions, it becomes possible to efficiently transfer necessary data between the CAD tools of the different design concepts supporting various design works, the table-format data and the object-oriented type DA database 34. As a result, interfaces between the systems designed with the different concepts can be established in addition to the advantages of the conventional design data management methods.

Figure 6:
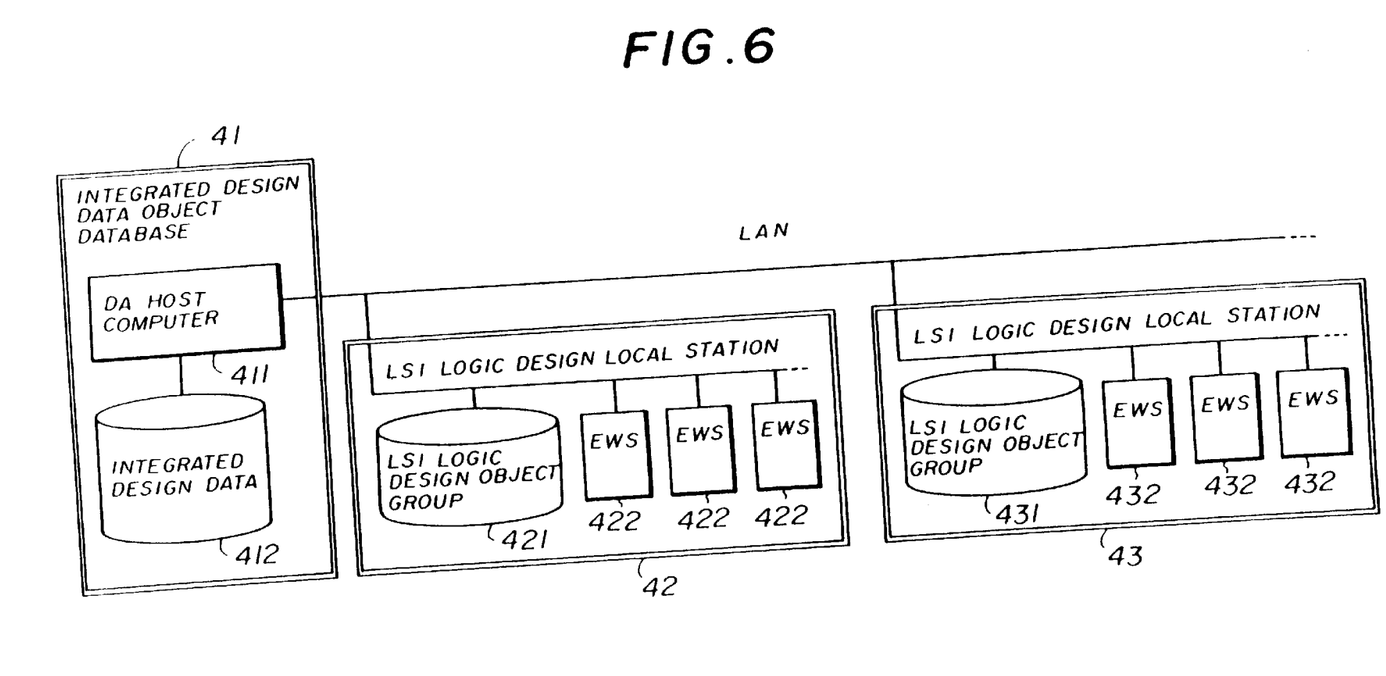
FIG. 6 is a block diagram of a process-distributed system (CAD system) according to yet another embodiment of the present invention.

FIG. 6 is a block diagram of a system for managing object-oriented data in the distributed way. The system includes an object database 41, which includes a DA host computer 411 and an integrated data file (data) 412. A plurality of groups of objects of the overall electronic circuit design data are stored in the object database 41.

Further, the system includes an LSI logic design local station 42 and an LSI mounting design local station 43. The local station 42 includes an LSI logic design data file, which stores groups of LSI logic data objects, and engineering workstations 422. The LSI mounting design location station 43 includes an LSI mounting design data object file 431, which stores groups of LSI mounting design objects, and engineering workstations 432. The object database 41 and the local stations 42 and 43 are connected together via a LAN (Local Area Network).

The designer accesses a group of objects stored in the LSI logic design data file 421 or the LSI mounting design data file 431 from the LSI logic design local station 42 or 43, and performs the design work. If data needed by the designer is not stored in a file of his or her own location station, the designer accesses the integrated design data file 412 of the object database 41 or another local station in order to obtain necessary data, and performs the design work.

The DA host computer 411 performs the distributed-process management in which what design data of the electronic circuit design data is processed by which local station and the resultant design data has been returned to the DA host computer 411.

In the above distributed process management method, the object database 41 manages the data of the overall electronic circuit design data, and the local stations manage the LSI logic design data and the LSI mounting design data. Alternatively, the local stations may manage data in each hierarchical layer, such as printed-circuit board design data and LSI design data. Also, the object database 41 has only management data, and the local stations object groups in the distributed manner.

Also, the DA host computer is not provided and a specific local station performs the processes carried out by the DA host computer. By employing the above-mentioned distributed process management method and positively utilizing the high-performance workstations, it is possible to cope with a degradation in the access performance caused by the use of the link structure connecting the objects together.

The above-mentioned embodiment of the present invention has been specifically described so that it performs design of printed circuits. However, the present invention includes management of design data of, for example a device having a sub-module of a printed-circuit board, a printed-circuit board having a sub-modules of an MCM (Multi-Chip Module), LSI or individual parts, or an LSI circuit having a sub-module of function blocks, function cells, basic logic gates and transistor elements.

Figure 7:
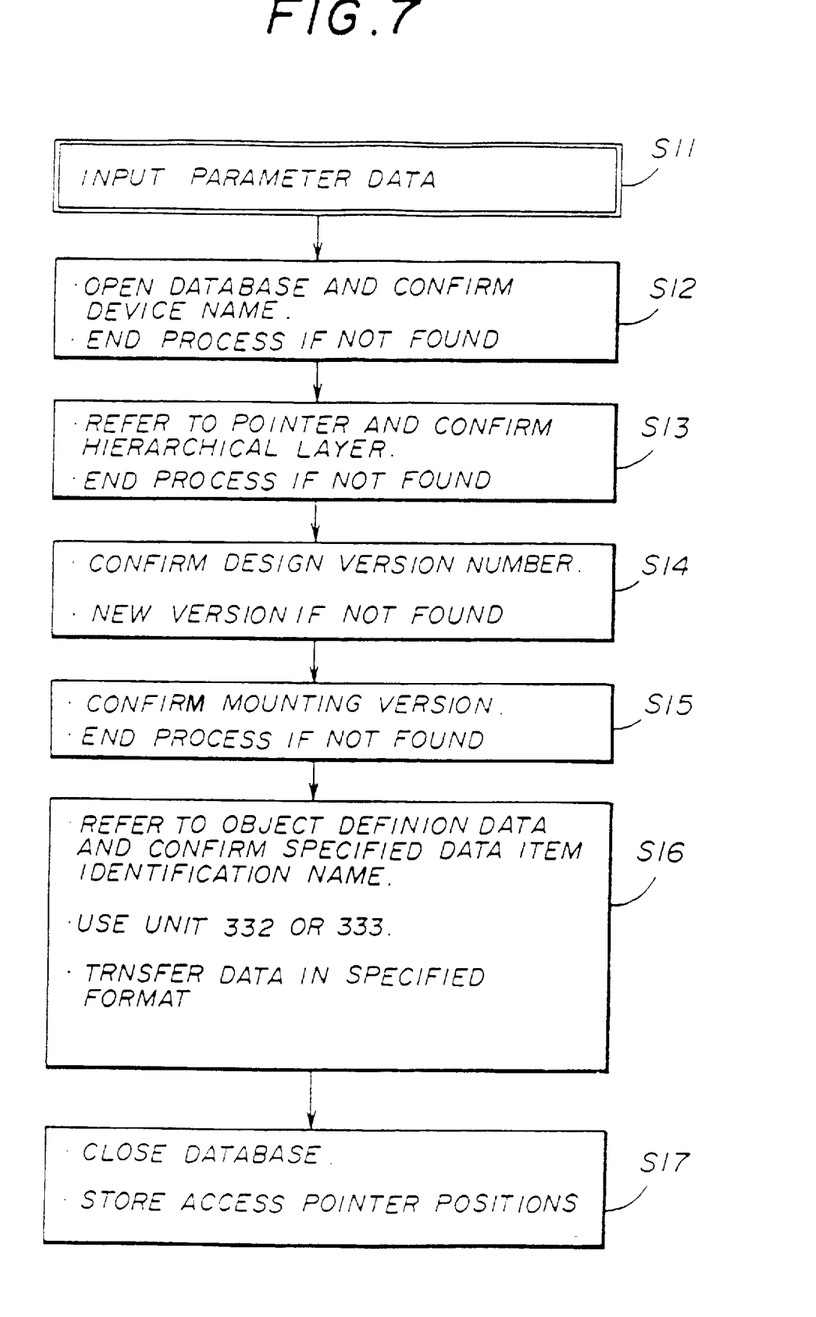
FIGS. 7 and 8 are flowcharts of the operation of the system shown in FIG. 5.
Figure 8:
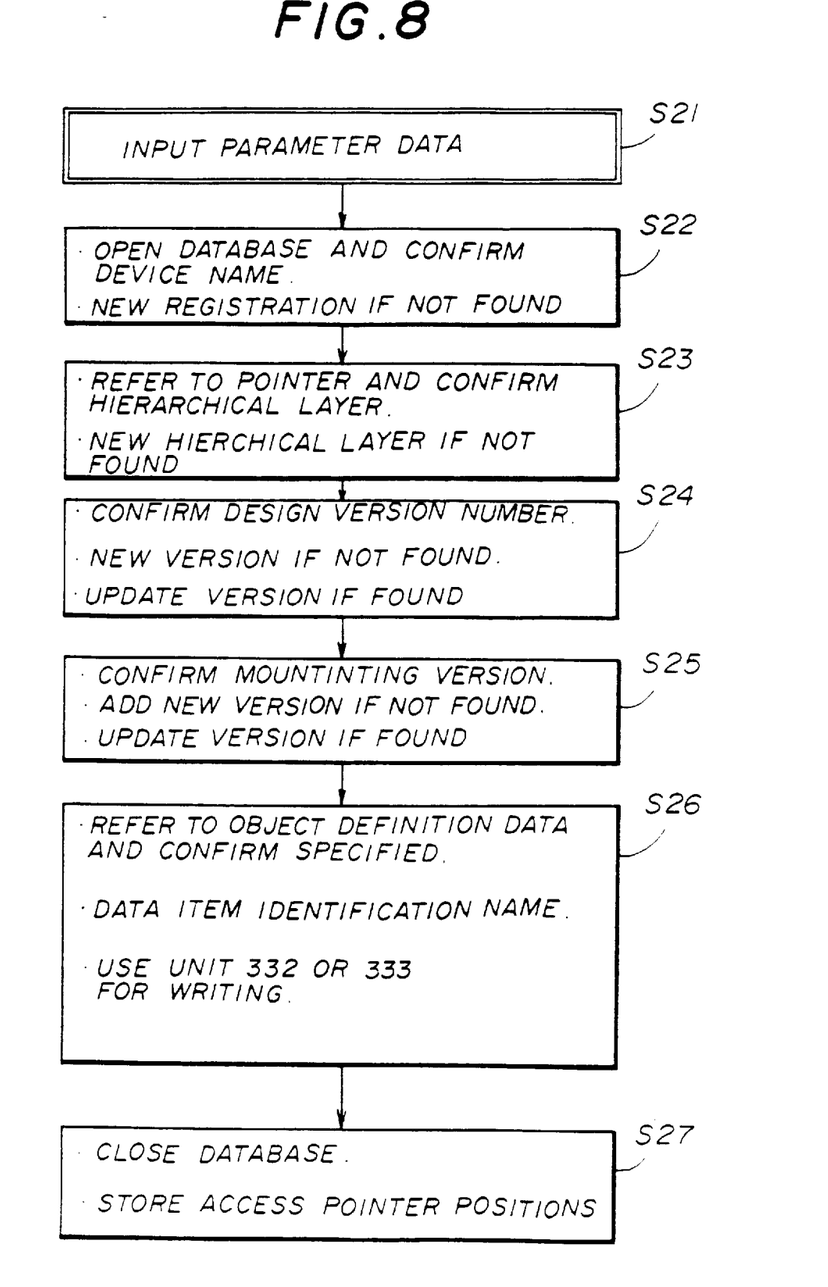

A further description will be given, with reference to FIGS. 7 and 8, of the operation of the distributed CAD system shown in FIG. 5. FIG. 7 shows the read operation in which design data is read from the database 34, and FIG. 8 shows the write operation in which design data is written into the database 34.

Referring to FIG. 7, in step S11, various parameters specified by, for example, a workstation are received in order to read design data from the database 34. Examples of the parameters are the name of a device to be designed, the name of a hierarchical layer, the identification name of a module, the name of the version number of design, the name of the version of mounting, and the identification name of a data item.

In step S12, in response to the parameter data given in step S11, the database access management unit 334 opens the database 34 and confirms whether the database 34 has data specified by the device name given in step S11. If no data specified by the device name is found, the process is ended with an error indication.

In step S13, the database access management unit 334 refers to the hierarchical-layer management pointers, and confirms whether the database 34 has data specified by the name of the hierarchical layer. If no data specified by the name of the hierarchical layer is found, the process is ended with an error indication.

In step S14, the database access management unit 334 confirms whether the database 34 has data specified by the name of the version number of design given in step S11. If there is no data specified by the name of the version number of design, the database 34 determines that a new version has been specified in step S11.

In step S15, the database access management unit 334 confirms whether the database 34 has data specified by the name of the version of mounting. If there is no data specified by the name of the version of mounting, the process is ended with an error indication.

In step S16, the database access management unit 334 accesses the object definition management unit 331, and confirms whether there is the identification name of the data item specified in step S11. Then, the unit 334 compares the object definition data with the data item identification name, and determines, on the basis of the comparison result, whether the unit 332 or unit 333 should be used in order to process the target design data read from the database 34. When the data to be read is described at the level having the arrangement structure, the management unit 333 is used to process the table-format data read from the database 34. In the other case, the management unit 332 is used to process the object-unit data read from the database 34. Then, the data read from the database 34 is given to the program requesting the data read. It is to be noted that the data is transferred to the program in the requested format.

In step S17, the database access management unit 334 closes the database 34. In order to efficiently process the next read request, the unit 334 stores the current access pointer positions.

Referring to FIG. 8, in step S21, various parameters specified by, for example, a workstation are received in order to write design data into the database 34. Examples of the parameters are the name of a device to be designed, the name of a hierarchical layer, the identification name of a module, the name of the version number of design, the name of the version of mounting, and the identification name of a data item.

In step S22, in response to the parameter data given in step S21, the database access management unit 334 opens the database 34 and confirms whether the database 34 has data specified by the device name given in step S21. If no data specified by the device name is found, the process unit 334 determines a new registration.

In step S23, the database access management unit 334 refers to the hierarchical-layer management pointers, and confirms whether the database 34 has data specified by the name of the hierarchical layer. If no data specified by the name of the hierarchical layer is found, the unit 334 determines that a new hierarchal structure is added.

In step S24, the database access management unit 334 confirms whether the database 34 has data specified by the name of the version number of design given in step S21. If there is no data specified by the name of the version number of design, the unit 334 determines that a new version number of design is added. If there is the specified data, the unit 334 determines that the version is updated.

In step S25, the database access management unit 334 confirms whether the database 34 has data specified by the name of the version of mounting. If no data specified by the name of the version of mounting is found, the unit 334 determines that a new mounting version is added. If the specified data is found, the unit 334 determines that the mounting version is updated.

In step S26, the database access management unit 334 accesses the object definition management unit 331, and confirms whether there is the identification name of the data item specified in step S21. Then, the unit 334 compares the object definition data with the data item identification name, and determines, on the basis of the comparison result, whether the unit 332 or unit 333 should be used in order to process the target design data written into the database 34. When the data to be written is described at the level having the arrangement structure, the management unit 333 is used to process the table-format data written into the database 34. In the other case, the management unit 332 is used to write the object-unit data into the database 34.

In step S27, the database access management unit 334 closes the database 34. In order to efficiently process the next write request, the unit 334 stores the current access pointer positions.

Figure 9:
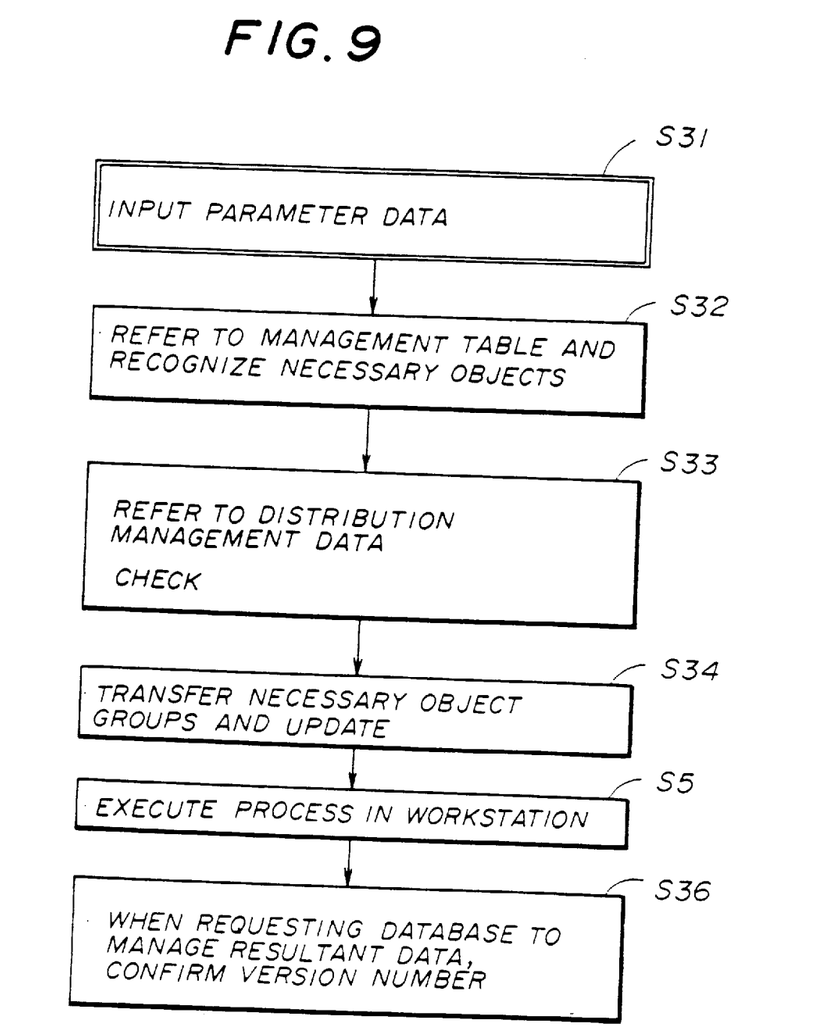
FIG. 9 is a flowchart of the operation of the system shown in FIG. 6.

FIG. 9 is a flowchart of the operation of the distributed-process system shown in FIG. 6. In step S31, various parameters are specified by the host computer 411 in order to process design data. Examples of the parameters are the name of a device to be designed, the name of a hierarchical layer, the identification name of a module, the name of the version number of design, the name of the version of mounting, and the identification name of a process object.

In step S32, the host computer 411 refers to the process object base necessary object management table (which is managed as a part of the integrated design data), and recognizes the necessary objects.

In step S33, the host computer 411 refers to distribution management data (distributed destination workstation identification name, the time when the distributed process is used, the designer who performs the distributed process, the process object and so on) related to the uppermost object among the objects managed by the hierarchical link. Then, the host computer 411 checks whether or not the same data is processed for the same process object in the distributed manner, and generates a message which shows the status of the distribution.

In step S34, the host computer 411 transfers the necessary object groups to the distribution destination workstation, and updates the distribution management data.

In step S35, the workstation which receives the transferred object groups performs the design work.

In step S36, when the workstation requests the integrated design data object database 41 of the host computer 411 to manage added design data resulting from the distributed process, the workstation confirms the version number of the above added design data, and transfers the added design data to the database 41, in which the transferred design data is stored with the confirmed version number. If the version number specified by the designer is already used, the designer is requested to confirm the version number. When the designer confirms the version number, the data of the version number is replaced by the design data resulting from the distributed process.

According to the present invention, the following advantages are obtained.

(1) It is possible to flexibly manage items and lengths of design data to be managed in each hierarchical-layer structure.

(2) It is possible to manage a design modification history management based on a unit that includes design data about a modified part and a peripheral part of the modified part without an increase in the overhead of control data for management, while a group of new design data including data related to parts which are not modified is saved, so that a large amount of design data are wastefully saved in two or more storage portions, so that an arbitrary version of design data can easily be recovered.

(3) It is possible to efficiently and integrally manage a plurality of pieces of mounting design data without a storage in which the identical design data is stored in two or more storage portions and easily taking out arbitrary mounting design data and associated design data.

(4) It is possible to provide a high-efficiency design data management function capable of handling a design in which different description levels are mixed.

(5) It is possible to efficiently and certainly manage the distributed process set forth in the aforementioned paragraph (5) rather than the manual management.

(6) It is possible to efficiently establish interfaces with any other CAD tools.

(7) It is possible to manage the design restrictions and design indices together with design data to finely support the design work with a reduced load.

The present invention is not limited to the specifically disclosed embodiments, and variations and modifications may be made without departing from the scope of the present invention.

What is claimed is:

1. A method for managing design data regarding an electronic circuit in order to design and analyze the electronic circuit, said method comprising:

(a) arranging the design data according to a hierarchical-layer module structure including a plurality of hierarchical layers;

(b) dividing the design data in each of hierarchical layers of the hierarchical-layer module structure into objects; and (c) connecting the objects together for each of the hierarchical layers together and connecting the objects together over the hierarchical layers, (d) associating data having an expression format different from a design description level of the design data having the hierarchical-layer module structure with the design data by a link.

2. The method as claimed in claim 1, further comprising the step of (e) associating design modification history information necessary in a design/analysis work with the design data by said link.

3. The method as claimed in claim 2, further comprising the step of (f) associating new design data generated in a design/analysis work with basic data among the design data by said link.

4. The method as claimed in claim 1, further comprising the step of (e) associating new design data generated in a design/analysis work with basic data among the design data by said link.

5. A method for managing design data regarding an electronic circuit in order to design and analyze the electronic circuit, said method:

(a) arranging the design data according to a hierarchical-layer module structure including a plurality of hierarchical layers;

(b) dividing the design data in each of the hierarchical layers of the hierarchical-layer module structure into objects; and (c) connecting the objects together for each of the hierarchical layers together and connecting the objects together over the hierarchical layers, the design data including items and lengths which are integrally managed;

(d) registering a design restriction condition with respect to a part of the design data; and (e) dynamically providing the design restriction condition in a design/analysis work in order to support the design/analysis work.

6. A method for managing design data regarding an electronic circuit in order to design and analyze the electronic circuit, said method comprising the steps of:

(a) arranging the design data according to a hierarchical-layer module structure including a plurality of hierarchical layers;

(b) dividing the design data in each of hierarchical layers of the hierarchical-layer module structure into objects;

(c) connecting the objects together for each of the hierarchical layers together and connecting the objects together over the hierarchical layers, the design data including items and lengths which are integrally managed;

(d) associating design modification history information necessary in a design/analysis work with the design data by a link; and (e) associating data having an expression format different from a design description level of the design data having the hierarchical-layer module structure with the design data by the link.

7. A CAD system having a function of managing design data regarding an electronic circuit in order to design and analyze the electronic circuit, said CAD system comprising:

first means for arranging the design data according to a hierarchical-layer module structure including a plurality of hierarchical layers;

second means for dividing the design data in each of the hierarchical layers of the hierarchical-layer module structure into objects;

third means for connecting the objects together for each of the hierarchical layers together and connecting the objects together over the hierarchical layers, the design data including items and lengths which are integrally managed; and fourth means for associating data having an expression format different from a design description level of the design data having the hierarchical-layer module structure with the design data by a link.

8. The CAD system as claimed in claim 7, further comprising fifth means for associating design modification history information necessary in the design/analysis work with the design data by said link.

9. The CAD system as claimed in claim 8, further comprising sixth means for associating new design data generated in a design/analysis work with basic data among the design data by said link.

10. A CAD system having a function of managing design data regarding an electronic circuit in order to design and analyze the electronic circuit, said CAD system comprising:

first means for arranging the design data according to a hierarchical-layer module structure including a plurality of hierarchical layers;

second means for dividing the design data in each of the hierarchical layers of the hierarchical-layer module structure into objects;

third means for connecting the objects together for each of the hierarchical layers together and connecting the objects together over the hierarchical layers, the design data including items and lengths which are integrally managed;

fourth means for registering a design restriction condition with respect to a part of the design data; and fifth means for dynamically providing the design restriction condition in a design/analysis work in order to support the design/analysis work.

11. A CAD system having a function of managing design data regarding an electronic circuit in order to design and analyze the electronic circuit, said CAD system comprising:

first means for arranging the design data according to a hierarchical-layer module structure including a plurality of hierarchical layers;

second means for dividing the design data in each of the hierarchical layers of the hierarchical-layer module structure into objects;

third means for connecting the objects together for each of the hierarchical layers together and connecting the objects together over the hierarchical layers, the design data including items and lengths which are integrally managed;

fourth means for associating design modification history information necessary in the design/analysis work with the design data by a link; and fifth means for associating data having an expression format different from a design description level of the design data having the hierarchical-layer module structure with the design data by said link.

12. A CAD system having a function of managing design data regarding an electronic circuit in order to design and analyze the electronic circuit, said CAD system comprising:

first means for arranging the design data according to a hierarchical-layer module structure including a plurality of hierarchical layers;

second means for dividing the design data in each of hierarchical layers of the hierarchical-layer module structure into objects;

third means for connecting the objects together for each of the hierarchical layers together and connecting the objects together over the hierarchical layers, the design data including items and lengths which are integrally managed;

fourth means for associating new design data generated in a the design/analysis work with basis data among the design data by a link; and fifth means for associating data having an expression format different from a design description level of the design data having the hierarchical-layer module structure with the design data by said link.

13. A CAD system having a function of managing design data regarding an electronic circuit in order to design and analyze the electronic circuit, said CAD system comprising:

first means for arranging the design data according to a hierarchical-layer module structure including a plurality of hierarchical layers;

second means for dividing the design data in each of the hierarchical layers of the hierarchical-layer module structure into objects; and third means for connecting the objects together for each of the hierarchical layers together and connecting the objects together over the hierarchical layers, the design data including items and lengths which are integrally managed;

a host computer for integrally managing an overall design data; and process-distributed computers that are connected to the host computer via a network and process a part of a design/analysis work, wherein the host computer comprises means for managing status of the design/analysis work in each of the process-distributed computers.

14. A CAD system having a function of managing design data regarding an electronic circuit in order to design and analyze the electronic circuit, said CAD system comprising:

first means for arranging the design data according to a hierarchical-layer module structure including a plurality of hierarchical layers;

second means for dividing the design data in each of hierarchical layers of the hierarchical-layer module structure into objects;

third means for connecting the objects together for each of the hierarchical layers together and connecting the objects together over the hierarchical layers, the design data including items and lengths which are integrally managed; and interface means for providing an interface with another CAD system which operates in an interface different from that of said CAD system.

* * * * *

UNITED STATES PATENT AND TRADEMARK OFFICE
CERTIFICATE OF CORRECTION

PATENT NO.: 5,856,925
DATED : January 5, 1999
INVENTOR(S): Sumiko MAEDA et al.

It is certified that error appears in the above-identified patent and that said Letters Patent is hereby corrected as shown below:

On the title page [54], change "MAKING" to --MANAGING--.

Col. 1, line 1, change "MAKING" to --MANAGING--.

Signed and Sealed this

Fifteenth Day of June, 1999

Attest:

Q. TODD DICKINSON

Attesting Officer

Acting Commissioner of Patents and Trademarks